(12) United States Patent
Mahood et al.

(10) Patent No.: US 7,358,321 B2
(45) Date of Patent: Apr. 15, 2008

(54) HIGH GLASS TRANSITION TEMPERATURE COPOLYCARBONATES, METHODS OF MANUFACTURE, AND USES THEREOF

(75) Inventors: James A. Mahood, Evansville, IN (US); Emine Elif Gurel, Evansville, IN (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 11/289,063

(22) Filed: Nov. 29, 2005

(65) Prior Publication Data

US 2007/0123686 A1    May 31, 2007

(51) Int. Cl.
C08G 64/00    (2006.01)

(52) U.S. Cl. .................. 528/196; 525/439; 528/198; 556/418; 556/437

(58) Field of Classification Search ............... 528/196, 528/198; 548/466, 471, 472, 476; 525/439; 556/418, 437
See application file for complete search history.

(56) References Cited

U.S. PATENT DOCUMENTS

| | | | |
|---|---|---|---|
| 4,134,936 | A | 1/1979 | Byrne et al. |
| 4,217,438 | A | 8/1980 | Brunelle et al. |
| 4,310,652 | A | 1/1982 | DeBona et al. |
| 5,344,910 | A | 9/1994 | Sybert |
| 5,455,310 | A | 10/1995 | Hoover et al. |
| 5,804,525 | A | 9/1998 | Boden et al. |
| 7,135,577 | B2 | 11/2006 | Rai et al. |
| 2005/0222334 | A1 | 10/2005 | Srinivasan et al. |
| 2005/0228137 | A1 | 10/2005 | Srinivasan et al. |

FOREIGN PATENT DOCUMENTS

| | | |
|---|---|---|
| JP | 06-003838 | 1/1994 |
| JP | 06-082624 | 3/1994 |
| JP | 2820277 | 5/1998 |
| JP | 2005068216 | 3/2005 |
| JP | 2005-06834 A | 4/2005 |

OTHER PUBLICATIONS

JP 03-070790; Publication Date Mar. 26, 1991 (translation of abstract only).
M.S. Lin, et al "Polymers With Improved Flammability Characteristics. I. Phenolphthalein-Related Homopolymers"; Journal of Polymer Science: Polymer Chemistry Edition, vol. 19, 2659-2670 (1981).
M.S. Lin, et al "Thermal Degradation Study of Phenolphthalein Polycarbonate", Journal of Polymer Scient: Polymer Chemistry Edition, vol. 19, 2773-2797 (1981).
International Search Report; International Application No. PCT/US2006/045619; Date of Mailing: Apr. 12, 2007.
Written Opinion; International Application No. PCT/US2006/045619; Date of Mailing: Apr. 12, 2007.
Boranowska, Z. et al, "Badanie Odpornosci Poliweglanow Na Hydrolize W Srodowisku Zasadowyn" Polimery, Instytut Chemii Prrzemysowej, Warsaw, PL, vol. 15, No. 1, (1970), pp. 12-14.
Korshak, V.V. et al, "Cardo Polymers" Reviews in Macromolecular Chemistry, Marcel Dekker, Inc., New York, vol. C1, No. 1, (1974), pp. 45-142.

*Primary Examiner*—Terressa Boykin

(57) ABSTRACT

A copolycarbonate is discloses, comprising units of the formula (1)

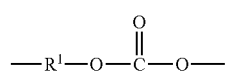

(1)

wherein 70 to 99.5 mole percent of the total number of $R^1$ groups are derived from a dihydroxy compound of formula (2)

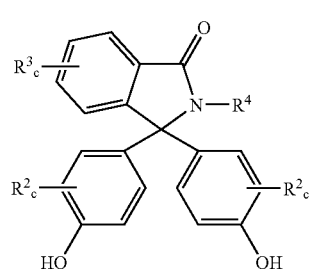

(2)

wherein $R^2$ and $R^3$ are each independently a halogen or a $C_{1-6}$ alkyl group, $R^4$ is a methyl or a phenyl group, and c is independently 0 to 4; and 0.5 to 30 mole percent of the total number of $R^1$ groups are derived from a dihydroxy compound of formula (3)

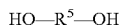

(3)

wherein at least 60% of the $R^5$ groups are aromatic, and the dihydroxy compound of formula (3) is not the same as the dihydroxy compound of formula (2), and wherein the copolycarbonate has a glass transition temperature of 250° C. or higher.

21 Claims, No Drawings

HIGH GLASS TRANSITION TEMPERATURE COPOLYCARBONATES, METHODS OF MANUFACTURE, AND USES THEREOF

BACKGROUND OF THE INVENTION

This disclosure relates to polycarbonate compositions, and in particular to copolycarbonate compositions having high glass transition temperatures, methods of manufacture, and uses thereof.

Polycarbonates derived from 2,2-bis(4-hydroxyphenyl)propane ("bisphenol A," or "BPA") are useful in the manufacture of articles and components for a wide variety of applications, from automotive parts to electronic appliances. 3,3-Bis-(4-hydroxyphenyl)-2-phenyl-2,3-dihydroisoindol-1-one ("BHPD," also known as "N-phenyl-3,3-bis(p-hydroxyphenyl)phthalimide") has also been used as a dihydric phenol reactant in the manufacture of polycarbonates, as described, for example, in U.S. Pat. No. 5,344,910 to Sybert. Polycarbonates derived from BHPD are high heat polymers, that is, polymers having a high glass transition temperature (Tg). Lin and Pearce, for example, have reported the synthesis of a BHPD-derived homopolycarbonate having a Tg of 250° C. (Journal of Polymer Science: Polymer Chemistry Edition, Vol. 19, and pp. 2659-2670 (1981).

There appears to be no reports in the literature of copolycarbonates derived from BHPD and another monomer that have a very high Tg, on the order of greater than about 250° C. It is expected that such polycarbonates would be suitable for use in high performance film applications such as organic light emitting devices (OLEDs), flexible printed circuits, flat panel displays, and backlit devices such as liquid crystal television and computer displays. High performance films preferably have excellent color, clarity, and resistance to heat, as well as low shrinkage and low coefficient of thermal expansion.

There accordingly remains a need in the art for polycarbonates suitable for use in high performance film applications, in particular polycarbonates with very high Tg and high temperature process compatibility. Other desirable features include high optical transparency, high color neutrality, low shrinkage, and low CTE. Still other desirable features include excellent smoothness when processed as films.

SUMMARY OF THE INVENTION

In one embodiment, a copolycarbonate comprises units of formula

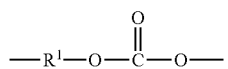

(1)

wherein 70 to 99.5 mole percent of the total number of $R^1$ groups are derived from a dihydroxy compound of formula (2)

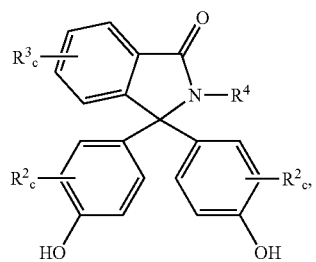

(2)

wherein $R^2$ and $R^3$ are each independently a halogen or a $C_{1-6}$ alkyl group, $R^4$ is a methyl or phenyl group, and each c is independently 0 to 4; and 0.5 to 30 mole percent of are derived from a dihydroxy compound of formula (3)

wherein at least 60% of the $R^5$ groups are aromatic, and the dihydroxy compound of formula (3) is not the same as the high Tg monomer of formula (2), and wherein the copolycarbonate has a glass transition temperature of 250° C. or higher.

In another embodiment, a method of manufacture of the above-described copolycarbonate comprises reacting a mixture of a dihydroxy compound of formula (2) and a dihydroxy compound of formula (3) in a reaction system comprising water, a substantially inert, substantially water-insoluble organic liquid, and an alkali or alkaline earth metal base to form a bischloroformate; reacting the bischloroformate with a capping agent in a reaction system comprising water, a substantially inert, substantially water-insoluble organic liquid, and an alkali or alkaline earth metal base, to produce a partially capped bischloroformate composition; and contacting the partially capped bischloroformate composition with an interfacial polycarbonate formation catalyst and an aqueous alkali metal or alkaline earth metal base to form the copolycarbonate.

Still another embodiment comprises a copolycarbonate formed by the foregoing process.

In yet another embodiment, an article comprises one of the above-described copolycarbonates.

In still another embodiment, a method of manufacture of an article comprises forming one of the above-described copolycarbonates into an article.

DETAILED DESCRIPTION OF THE INVENTION

It has been found by the inventors hereof that very high Tg copolycarbonates can unexpectedly be obtained using residues derived from dihydroxy compounds of formula (2), including 3,3-bis-(4-hydroxyphenyl)-2-phenyl-2,3-dihydroisoindol-1-one, and small amounts of a residue derived from at least one other type of dihydroxy compound, e.g., BPA, using a bischloroformate manufacturing process. Such copolycarbonates have high molecular weights, and can be used to provide optically clear films suitable for high performance applications. It has heretofore been difficult to obtain optically clear films from high Tg copolycarbonates derived from BHPD because they tend to crystallize during film formation. Use of a different dihydroxy compound (such as BPA) prevents crystallization of the films during casting and consolidation. The high Tg copolycarbonates have excellent properties, such as very high Tg, optical clarity, low color, low coefficient of thermal expansion and/or low shrinkage.

As used herein, the term "high Tg copolycarbonate" and "high Tg copolycarbonate resin" means polymers comprising repeating structural carbonate units of formula (1)

(1)

in which a portion of the $R^1$ groups are derived from a dihydroxy compound of formula (2)

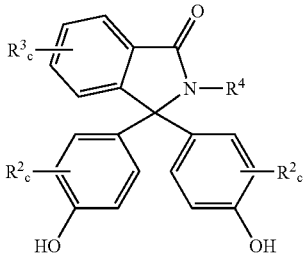
(2)

wherein $R^2$ and $R^3$ are each independently a halogen or a $C_{1-6}$ alkyl group, $R^4$ is a methyl or phenyl group, and each c is independently 0 to 4.

In a specific embodiment, each c is 0. In another embodiment, $R^4$ is a phenyl group. In another specific embodiment, a major portion of the $R^1$ groups is derived from BHPD, which has the following formula:

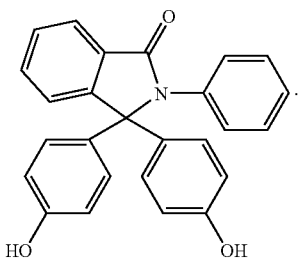

In addition, a portion of the $R^1$ groups is derived from a dihydroxy hydrocarbylene compound of formula (3)

$$HO—R^5—OH \quad (3)$$

wherein at least 60% of the $R^5$ groups are aromatic, and that is different from the dihydroxy compound of formula (2). The dihydroxy hydrocarbylene of formula (3) contains two hydroxyl groups attached to a divalent $C_{1-36}$ hydrocarbon group, that is, a group containing carbon, hydrogen, and optionally one or more other heteroatoms such as oxygen, nitrogen, sulfur, or a halide. Exemplary hydrocarbyl groups include substituted and unsubstituted $C_{1-36}$ alkylene groups, substituted and unsubstituted $C_{3-36}$ cycloalkylene groups, and substituted and unsubstituted $C_{6-36}$ arylene groups, provided that at least 60% of the groups are aromatic.

For example, this portion of the $R^1$ groups can have the structure of formula (4)

$$-A^1-Y^1-A^2- \quad (4)$$

wherein each of $A^1$ and $A^2$ is independently a monocyclic divalent aryl radical, and $Y^1$ is —O—, —S—, —S(O)—, —S(O$_2$)—, —C(O)—, or a divalent, substituted or unsubstituted $C_{1-30}$ hydrocarbon. The carbonate units containing the residues of formula (4) may be produced by the reaction of dihydroxy compounds of formula (5)

$$HO-A^1-Y^1-A^2-OH \quad (5)$$

wherein $Y^1$, $A^1$ and $A^2$ are as described above. Included are bisphenol compounds of general formula (6)

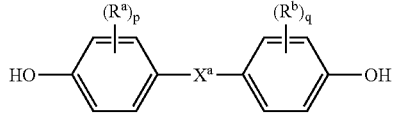
(6)

wherein $R^a$ and $R^b$ are each independently a halogen atom or a monovalent $C_{1-6}$ alkyl group; p and q are each independently integers of 0 to 4; and $X^a$ is a hydrocarbylene wherein one to four carbon atom separate the two phenyl rings. In one embodiment, $X^a$ represents one of the following groups:

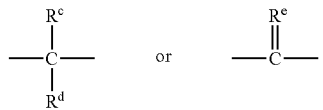

wherein $R^c$ and $R^d$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group. Exemplary $X^a$ groups are methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. A specific class of alkyl-substituted cyclohexylidenes may be derived from bisphenols of formula (7)

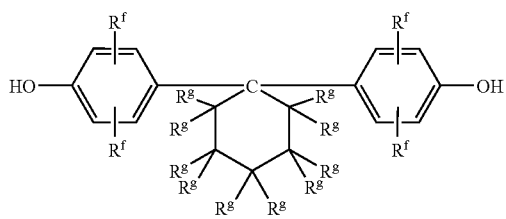
(7)

wherein each $R^f$ is independently hydrogen, $C_{1-12}$ alkyl, or halogen; and each $R^g$ is independently hydrogen or $C_{1-12}$ alkyl. Such cyclohexane-containing bisphenols, for example the reaction product of two moles of a phenol with one mole of a hydrogenated isophorone, are useful for making copolycarbonate polymers with high glass transition temperatures and high heat distortion temperatures.

Additional illustrative, non-limiting examples of suitable bisphenols include the following: bis(4-hydroxyphenyl)methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis (4-hydroxyphenyl)acetonitrile, 2,2-bis(3-methyl-4- hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl))propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), and the like, as well as combinations comprising at least one of the foregoing dihydroxy compounds.

Specific examples of bisphenol compounds that may be represented by formula (5) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, and 1,1-bis(4-hydroxy-3-methylphenyl) cyclohexane (DMBPC). Combinations comprising at least one of the foregoing dihydroxy compounds may also be used.

In the alternative, or in addition, $R^1$ can be derived from arylene-containing compounds such as 4,4'-dihydroxybiphenyl, 1,6-dihydroxynaphthalene, 2,6-dihydroxynaphthalene, or an aromatic dihydroxy compound of formula (8)

(8)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of such compounds include resorcinol, substituted resorcinol compounds such as 4-bromoresorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like, and catechol. Small amounts of carbonate units derived from hydroquinone or substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone may also be used.

In order to obtain high Tg, high molecular weight copolymers, particularly copolymers with high optical clarity, 70 to 99.5 mole % of the $R^1$ groups in the high Tg copolycarbonate are derived from a compound of formula (2), and 0.5 to 30 mole % of the $R^1$ groups are derived from another dihydroxy compound. When less than 70 mole % of units derived from a compound of formula (2) are present, it is difficult to achieve a high molecular weight and/or a Tg greater than 250° C. When greater than 99.5 mole % of such units are present, the polymer tends to crystallize and loses optical clarity. In one embodiment, 75 to 99 mole % of the $R^1$ groups in the high Tg copolycarbonate are derived from a compound of formula (2), and 1 to 25 mole % of the $R^1$ units are derived from another dihydroxy compound. In another embodiment, 80 to 98 mole % of the $R^1$ groups in the high Tg copolycarbonate are derived from a compound of formula (2), and 2 to 20 mole % of the $R^1$ units are derived from another dihydroxy compound. In still another embodiment, 85 to 97 mole % of the $R^1$ groups in the high Tg copolycarbonate are derived from a compound of formula (2), and 3 to 15 mole % of the $R^1$ units are derived from another dihydroxy compound. In yet another embodiment, 90 to 96 mole % of the $R^1$ groups in the high Tg copolycarbonate are derived from a compound of formula (2), and 4 to 10 mole % of the $R^1$ units are derived from another dihydroxy compound. In another embodiment, 93 to 95 mole % of the $R^1$ groups in the high Tg copolycarbonate are derived from a compound of formula (2), and 5 to 7 mole % of the $R^1$ units are derived from another dihydroxy compound.

Attempts to produce high Tg copolycarbonates using standard interfacial polymerization processes, for example were unsuccessful. In such processes, dihydroxy reactant(s) are dissolved or dispersed in aqueous caustic soda (sodium hydroxide) or potash (potassium hydroxide), and the resulting mixture added to a suitable water-immiscible solvent medium. The reactants are then contacted with a carbonate precursor in the presence of a catalyst such as triethylamine or a phase transfer catalyst, under controlled pH conditions, e.g., about 8 to about 10. The highest weight average molecular weights obtainable using triethylamine was up to about 10,000, and the highest weight average molecular weights obtainable using phase transfer catalysts was 50,000 to 60,000.

It has been found, however, that the high Tg copolycarbonates can be produced using a bischloroformate-type process. In this process, an aromatic bischloroformate composition is first formed from the appropriate mixture of a compound of formula (2) and another dihydroxy compound. Such bischloroformates are of the formula (9)

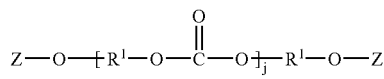
(9)

wherein $R^1$ is as defined above, j is a positive integer, and Z is H, an alkaline metal or alkaline earth metal cation used in the formation of the bischloroformate, or a chloroformate group (—C(O)Cl), provided that at least one Z is a chloroformate group. Preferably, the majority of the Z groups will be a chloroformate.

Methods for the formation of bischloroformates are known, for example contacting a mixture of the dihydroxy compounds in a substantially inert, substantially water-immiscible solvent and an aqueous alkali or alkaline earth metal solution with phosgene.

Illustrative solvents are aliphatic hydrocarbons such as hexane and n-heptane; chlorinated aliphatic hydrocarbons such as methylene chloride, chloroform, carbon tetrachloride, dichloroethane, trichloroethane, tetrachloroethane, dichloropropane and 1,2-dichloroethylene; aromatic hydrocarbons such as benzene, toluene and xylene; and substituted aromatic hydrocarbons such as chlorobenzene, o-dichlorobenzene, the chlorotoluenes, nitrobenzene and acetophenone. The most commonly used water-immiscible solvents include methylene chloride, 1,2-dichloroethane, chlorobenzene, toluene, and the like.

The aqueous alkali solution is an aqueous solution of a strongly basic hydroxide such as sodium hydroxide or potassium hydroxide. The concentration of the basic hydroxide in the aqueous alkali solution can be 1 to 50% by weight, specifically 30 to 50% by weight. The amount of the basic hydroxide is in slight excess of 2 moles, for example 2.1 to 2.20 moles per mole of the dihydroxy compound.

The aromatic bischloroformate composition is then combined with a capping agent in a reaction mixture comprising water, a substantially inert, substantially water-insoluble organic liquid as described above, and an alkali or alkaline earth metal base, to produce a partially capped bischloroformate composition.

The capping agent (also referred to as a chain stopper in the art) limits molecular weight growth rate, and so controls molecular weight in the bischloroformate. Exemplary chain-stoppers include certain mono-phenolic compounds, mono-carboxylic acid chlorides, and/or mono-chloroformates. Suitable mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and mono-ethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Formation of the partially capped bischloroformate composition can be effected under a wide variety of interfacial reaction conditions suitable for the reaction of chloroformates with hydroxyaromatic compounds. Thus, contact of the capping agent with the bischloroformate composition may, for example, be at temperatures of 0° to 50° C. and pH values of the aqueous phase of 2 to 11.5. Time periods may be from a few seconds to 20 minutes or more; longer time periods ordinarily provide no discernible advantage. Suitable conditions are known to those skilled in the art and/or may be determined by routine experimentation. At low pH values, it may frequently be useful to conduct the reaction over a relatively long time period and/or at relatively high temperatures, exemplified by the reflux temperature of methylene chloride (about 40° C.). When the pH is high, on the other hand, lower temperatures and/or shorter reaction times may be advisable to avoid hydrolysis of chloroformate groups.

The proportion of capping agent with respect to bischloroformate will depend on the desired molecular weight and/or intrinsic viscosity of the linear high Tg copolycarbonate product. Amounts of 0.5 to 2.0 mole percent, based on the moles of compounds of formula (2) and (3) the bischloroformate composition, are generally used. Consistent polymerization is particularly challenging in high molecular weight resins because the use of low levels of endcap means that even minor variation in the amount of endcap converted into linear low molecular weight species will dramatically affect overall molecular weight.

By far the greater proportion of the capped molecules are monocapped and therefore still reactive at one end. Dicapped molecules would, of course, be inert to further reaction. Thus, the reaction conditions (concentration, relative amounts of reactants, and reaction pH, time and temperature) are adjusted to minimize the formation of dicapped molecules.

The partially capped bischloroformate composition is then contacted with an interfacial polycarbonate formation catalyst and additional aqueous alkali metal or alkaline earth metal base to form the high Tg copolycarbonate. Such contact is conveniently in the presence of the substantially inert, substantially water-immiscible solvent, and is therefore heterogeneous. Additional dihydroxy compound or salt thereof may also be present.

As the interfacial polycarbonate formation catalyst, there may be used, for example, tertiary amines and phase transfer catalysts. Exemplary tertiary amines include aliphatic amines such as triethylamine, tri-n-propylamine, diethyl-n-propylamine and tri-n-butylamine and highly nucleophilic heterocyclic amines such as 4-dimethylaminopyridine. The preferred amines dissolve preferentially in the organic phase of the reaction system to increase contact between the amine and bischloroformate composition. The most useful amines are trialkylamines containing no branching on the carbon atoms in the 1- and 2-positions, particularly are tri-n-alkylamines in which the alkyl groups contain up to about 4 carbon atoms. Also useful are quaternary ammonium and phosphonium salts and amidines of the type known in the art to be effective in the reaction of phosgene with bisphenols.

Among the phase transfer catalysts that may be used are catalysts of the formula $(R_3)_4Q^+X$, wherein each $R_3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl—, Br—, a $C_{1-8}$ alkoxy group or a $C_{6-18}$ aryloxy group. In a specific embodiment X is a halogen such as chloride or a hydroxyl group. An effective amount of phase transfer catalyst is generally 0.1 to 10 wt. %, based on the total weight of dihydroxy compounds (2) and (3). In another embodiment an effective amount of phase transfer catalyst is 0.5 to 2 wt. % based on the weight total weight of dihydroxy compounds (2) and (3) in the phosgenation mixture.

In general, the copolycarbonate formation reaction is conducted at 0 to 100° C., specifically 20 to 50° C.; at a pH in excess of about 8, particularly 9 to 11; and using 0.235 to 3.0 mole percent catalyst, based on structural units in the bischloroformate composition.

Either batch or continuous conditions may be used for the production of the high Tg copolycarbonates, or one step may be conducted batchwise and the other continuously.

Branched copolycarbonate blocks may be prepared by adding a branching agent during polymerization, provided that the branching agents do not significantly adversely affect the Tg, weight average molecular weight, optical clarity, or other desired characteristic(s) of the copolycarbonate. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of about 0.05 to 2.0 wt. %. Mixtures comprising linear copolycarbonates and branched copolycarbonates may be used.

The high Tg copolycarbonates can be isolated from the reaction mixture, or used as produced to form articles. Standard methods of isolation, for example steam precipitation, can adversely affect the molecular weight of the high Tg copolycarbonates. Where very high molecular weight copolycarbonates are formed, steam precipitation can be used. However, methods such as anti-solvent precipitation (using methanol, for example) do not have such an adverse affect on molecular weight. In an advantageous feature, an article such as a film can be formed directly from the reaction solution (by solvent casting, e.g.) without intermediate isolation of the high Tg copolycarbonate.

The high Tg copolycarbonates can have a number of desirable properties, including high Tg, good ductility, thermal stability, optical clarity, absence of color, resistance to yellowing, low shrinkage, and/or low CTE.

The Tg of the high Tg copolycarbonates thus obtained is 250° C. or greater, specifically 255° C. or greater, 260° C. or greater, 265° or greater, 270° C. or greater, or 275° C. or greater, up to about 285° C.

The weight average molecular weight (Mw) of the high Tg copolycarbonates is 40,000 to 150,000 Daltons, measured using gel permeation chromatography (GPC) with polycarbonate standards. In one embodiment, the molecular weight is greater than or equal to 60,000, greater than or equal to 70,000, greater than or equal to 80,000, or 90,000 to 120,000 Daltons.

In an advantageous feature, the high Tg copolycarbonates can be manufactured to have a high optical clarity over a wide range of wavelengths. Thus, the transmission values of the high Tg copolycarbonates can be greater than 50%, greater than 60%, greater than 70%, greater than 80%, or greater than 90%, measured over wavelengths of 400-800 nm according to ASTM D1003-97.

The high Tg copolycarbonates can also have low shrinkage and/or a low coefficient of thermal expansion (CTE), both of which can be determined in accordance with according to ASTM E831-93. In one embodiment the steady state rate of shrinkage of the high Tg copolycarbonate is low, being less than 40 parts per million per hour (ppm/hr), less than 25 ppm/hr, specially less than 20 ppm/hr, than less than 10 ppm/hr, or even as low as 1 ppm/hr, each measured at 200° C. In one embodiment the rate of shrinkage of the high Tg copolycarbonate is 10 to 23 ppm/hr. Alternatively, the shrinkage of the high Tg copolycarbonate is 40 ppm or less after heating at 200° C. for 8 hours, 30 ppm or less, 25 ppm or less, 15 ppm or less, or 10 ppm or less after heating at 200° C. for 8 hours. Shrinkage can be as low as 1 ppm after heating at 200° C. for 8 hours.

The high Tg copolycarbonate can also have a CTE of 80 ppm/° C. or less, or 70 ppm/° C. or less, or even 60 ppm/° C. or less, down to 50 ppm/° C., each measured over a temperature range of 50 to 150° C. In one embodiment, the CTE of the high Tg copolycarbonate is 54 to 63 ppm/° C., measured over 50° C. to 150° C.

The amount and type of other polymers and/or additives used with the high Tg copolycarbonates are selected so as to provide the desired properties to the high Tg copolycarbonate without substantially adversely impacting other properties needed for a given application. Such selections may be made without undue experimentation by one of ordinary skill in the art, based on the desired properties of the composition and the known properties of the additives. For example, use of certain polymers and/or additives can be limited by the processing conditions used for the high Tg copolycarbonates. In one embodiment described below, film comprising the high Tg copolycarbonates are formed by solution casting. Other polymers and/or additives (for example, impact modifiers, UV stabilizers, and the like), will preferably also be soluble in the solution used to cast the film. The amount and type of other polymers and/or additives used with the high Tg copolycarbonate may also be limited by the intended application. For example, where a transparent film is desired, it may not be possible to use certain impact modifiers, fillers, colorants, or anti-drip agents.

The high Tg copolycarbonates described herein can be used in combination with other polycarbonate polymers, including other homopolycarbonates, polycarbonate copolymers comprising different $R^1$ groups, and/or copolymers comprising polycarbonate units and other polymer units such as ester units or diorganosiloxane units. As used herein, a "combination" is inclusive of blends, mixtures, alloys, and the like. The high Tg copolycarbonates may also be used in combination with other polymers, for example polyesters such as polyarylates, polyacetals, polystyrenes, polyamides, polyamideimides, polyimides, polyetherimides, polysulfones such as polyarylsulfones and polyethersulfones, polysulfonates, polysulfonamides, polysulfides such as polyphenylene sulfides, polythioesters, polytetrafluoroethylenes, polyetherketones, polyether etherketones, polyether ketone ketones, polyvinyl ethers, polyvinyl thioethers, polyvinyl, polyvinyl ketones, polyvinyl halides alcohols such as polyvinyl chlorides, polyvinyl nitriles, polyvinyl esters, or the like, or a combination comprising at least one of the foregoing organic polymers.

Epoxy functional materials that are miscible with the copolycarbonates can be added to help maintain the molecular weight of the polymer during processing. The epoxy functional compounds include aliphatic or cycloaliphatic compounds having epoxy or polyepoxy functionalization. The epoxy functional compounds can be derived by the reaction of an epoxidizing agent, such as peracetic acid, and an aliphatic or cycloaliphatic point of unsaturation in a molecule. Other functionalities that do not interfere with an epoxidizing action of the epoxidizing agent can also be present in the molecule, for example, esters, ethers, hydroxy, ketones, halogens, aromatic rings, and the like. An exemplary class of epoxy functionalized materials are glycidyl ethers of aliphatic or cycloaliphatic alcohols or aromatic phenols. The alcohols or phenols may have more than one hydroxyl group. Suitable glycidyl ethers may be produced by the reaction of, for example, monophenols or the diphenols of formula (6), such as BPA with epichlorohydrin. Polymeric aliphatic epoxides might include, for example, copolymers of glycidyl methacrylate or allyl glycidyl ether with methyl methacrylate, styrene, acrylic esters or acrylonitrile. Specific examples of suitable epoxy functionalized compounds include glycidol, bisphenol-A diglycidyl ether, tetrabromobisphenol-A diglycidyl ether, the diglycidyl ester of phthalic acid, the diglycidyl ester of hexahydrophthalic acid, epoxidized soybean oil, butadiene diepoxide, tetraphenylethylene epoxide, dicyclopentadiene dioxide, vinylcyclohexene dioxide, bis(3,4-epoxy-6-methylcyclohexylmethyl) adipate, and 3,4-epoxycyclohexylmethyl-3,4-epoxycyclohexane carboxylate. Exemplary epoxy-functional materials that are commercially available include those available from Dow Chemical Company under the tradename DER-332, from Resolution Performance Products under the trade names EPON™ 826, 828, and 871; from Ciba-Geigy Corporation under the tradenames CY-182 and CY-183; and from Union Carbide under the tradename ERL-4221. The epoxy functionalized materials are generally present in an amount of 0.01 to 10.0 weight parts of the per 100 weight parts of copolycarbonate component.

The copolycarbonates may further be combined with an impact modifier composition to increase impact resistance. These impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (10)

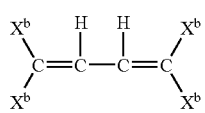

(10)

wherein each $X^b$ is independently hydrogen, $C_1$-$C_5$ alkyl, or the like. Examples of conjugated diene monomers that may be used are butadiene, isoprene, 1,3-heptadiene, methyl-1, 3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (11)

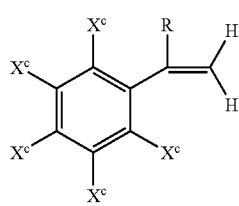

(11)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (12)

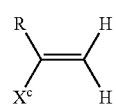

(12)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (12) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (8), (9), or (10). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (11) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (12). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl(meth)acrylate, n-propyl(meth) acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co) polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (10) or (11), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy) methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

Various additives ordinarily incorporated into the copolymer resin compositions, with the proviso that the additives are preferably selected so as to not significantly adversely affect the desired properties of the high Tg copolycarbonates. Mixtures of additives may be used. Such additives may be mixed at a suitable time during the mixing of the components for forming the composition.

When the high Tg copolycarbonates are used to form films, and particularly transparent film, type of filler and particle size are selected so as to not significantly adversely affect the smoothness or desired level of transparency. Fillers that are non-aggregating in the casting solution are particularly useful.

Suitable fillers or reinforcing agents may include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks, or the like; organic fillers for example fluoropolymers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; nanoparticluate fillers, such as nanotubes, nanoclays, polymer-clay nanocomposites, or the like; as well as additional fillers and reinforcing agents such as mica (powder or plate), clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide(aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 500 parts by weight, based on 100 parts by weight of the copolycarbonate component.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 1 to about 10 parts by weight, based on 100 parts by weight of the copolycarbonate component.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 1 to about 10 parts by weight, based on 100 parts by weight of the copolycarbonate component.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 1 to about 10 parts by weight, based on 100 parts by weight of the copolycarbonate component.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1, 4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 1 to about 10 parts by weight, based on 100 parts by weight of the copolycarbonate component.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 1 to about 25 parts by weight, based on 100 parts by weight of the copolycarbonate component.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide(polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL® from Panipol), polypyrrole and polythiophene (commercially available from Bayer), which retain some of their intrinsic conductivity at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 1 to about 25 parts by weight, based on 100 parts by weight of the copolycarbonate component.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetra-carboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.5 to about 25 parts by weight, based on 100 parts by weight of the copolycarbonate component.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 25 parts by weight, based on 100 parts by weight of copolycarbonate component.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

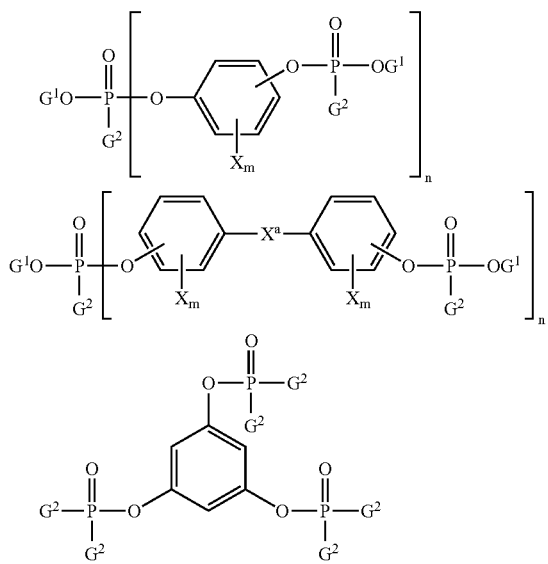

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis (diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 0.1 to about 20 parts by weight, based on 100 parts by weight of the copolycarbonate component.

Halogenated materials may also be used as flame retardants, for example halogenated compounds and resins of formula (13)

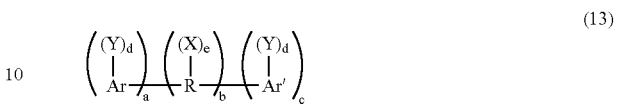

(13)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (13) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane;

bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen-containing flame-retardants are generally present in amounts of about 1 to about 25 parts by weight, based on 100 parts by weight of the copolycarbonate component.

Alternatively, the thermoplastic composition may be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of the composition, excluding any filler.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.1 to about 20 parts by weight, based on 100 parts by weight of the copolycarbonate component.

Another useful type of flame retardant is a polysiloxane-polycarbonate copolymer having polydiorganosiloxane blocks comprise repeating structural units of formula (14)

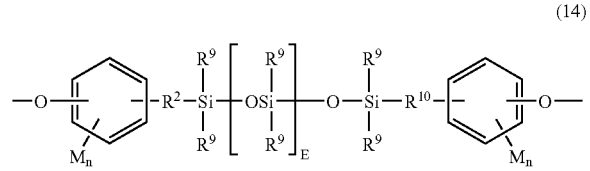

(14)

wherein each occurrence of $R^9$ is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing $R^9$ groups may be used in the same copolymer. $R^{10}$ in formula (14) is a divalent $C_1$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

E in formula (14) is selected so as to provide an effective level of flame retardance to the thermoplastic composition. The value of E will therefore vary depending on the type and relative amount of each component in the thermoplastic composition, including the type and amount of copolycarbonate, impact modifier, polysiloxane-polycarbonate copolymer, and other flame-retardants. Suitable values for E may be determined by one of ordinary skill in the art without undue experimentation using the guidelines taught herein. Generally, E has an average value of 2 to about 1000, specifically about 10 to about 100, more specifically about 25 to about 75. In one embodiment, E has an average value of about 40 to about 60, and in still another embodiment, E has an average value of about 50. Where E is of a lower value, e.g., less than about 40, it may be necessary to use a relatively larger amount of the polysiloxane-polycarbonate copolymer. Conversely, where E is of a higher value, e.g., greater than about 40, it may be necessary to use a relatively smaller amount of the polysiloxane-polycarbonate copolymer.

In one embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

The polysiloxane-polycarbonate copolymer may be manufactured by reaction of the corresponding dihydroxy polysiloxane with a carbonate source and a dihydroxy aromatic compound of formula (3), optionally in the presence of a phase transfer catalyst as described above. Suitable conditions are similar to those useful in forming copolycarbonates. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 5 to about 50 parts by weight, more specifically about 10 to about 40 parts by weight, based on 100 parts by weight of copolycarbonate component.

Anti-drip agents may also be used in the composition, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of 0.1 to 5 percent by weight, based on 100 parts by weight of the copolycarbonate component.

Radiation stabilizers may also be present, specifically gamma-radiation stabilizers. Suitable gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon may be a methylol group (—$CH_2OH$) or it may be a member of a more complex hydrocarbon group such as —$CR^4HOH$ or —$CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.001 to 1 wt %, more specifically 0.01 to 0.5 wt %, based on 100 parts by weight of the copolycarbonate component.

Thermoplastic compositions comprising the copolycarbonate resin and one or more of the optional other polymer(s), optional filler(s), and optional additive(s) foregoing may be manufactured by methods generally available in the art, for example, in one embodiment, in one manner of proceeding, powdered copolycarbonate resin and/or other optional components are first blended, optionally with fillers in a HENSCHEL-Mixer® high speed mixer. Other low shear processes, including but not limited to hand mixing, may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the copolycarbonate compositions are also provided. The copolycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like.

If used, the temperature of the blending, extruding, and/or shaping are carefully controlled so as to minimize or eliminate degradation of the high molecular weight of the copolycarbonates. Alternatively, and more conveniently in view of the high Tg of the copolycarbonates, the resins may first be dissolved in a solvent, and then mixed with other additives. In one embodiment, the copolycarbonate solution as produced is mixed with any other additives. The solvent can then be removed, and the composition shaped into articles as describe above. Again, however, it is more convenient to form the article from a solution of the composition.

For example, in one embodiment the high Tg copolycarbonate compositions are formed into films, particularly transparent films, for high performance applications. The films can be formed by methods known in the art, for example spin coating, casting, dipping, bar coating, or roll coating a solution of the high Tg copolycarbonate dissolved in a solvent, together with any optional additives. In an exemplary process, the copolycarbonate resin is dissolved in an organic solvent such as dichloromethane to an appropriate concentration, for example 5 to 50% by weight of resin, together with any optional additives. Suitable solvents and concentrations are readily determined by one of ordinary skill in the art, depending on the solubility of the copolycarbonate, the molecular weight of the copolycarbonate, the type and presence of any additives, and like considerations. The solution as produced in the manufacturing process, i.e., without any intermediate isolation of the high Tg copolycarbonate, can also be used.

This solution is formed into a film having an appropriate thickness, for example by casting or spin coating onto a substrate or a release sheet. The film is dried at a temperature effective to remove the solvent without significantly adversely affecting the physical properties if the film. The temperature at which the solvent is evaporated will vary depending on the particular resin composition and solvent used. Suitable temperatures can be, for example 20° C. to 200° C., specifically 30° C. to 150° C., still more specifically 40° C. to 100° C. The thickness of the film after solvent removal will depend on the intended application, but can be, for example, 1 micrometer to 200 micrometers, specifically 10 micrometers to 150 micrometers, more specifically 20 micrometers to 100 micrometers.

The films can be used in a variety of applications, including high performance applications. In one embodiment, the films are used in organic light emitting devices (OLEDs), flexible printed circuits, flat panel displays, and backlit devices such as liquid crystal television and computer displays.

The copolycarbonate compositions are further illustrated by the following non-limiting examples.

EXAMPLE 1

To a 75-liter (L) reactor equipped with mechanical agitation, condenser, and caustic scrubber vent system was charged 2395 grams (g) BHPD (6.1 moles), 104 g BPA (0.45 moles), 10 L deionized water, and 29 L dichloromethane. The reactor was flushed with nitrogen at a rate of 10 grams per minute (g/min) for 5 minutes. Phosgene (1000 g, 10.1 moles) was then added at a rate of 60 g/min to the reactor while 50 wt % aqueous NaOH (caustic) was added at a rate sufficient to maintain a pH of 7.0. A solution of 28 g p-cumylphenol in 1 L dichloromethane was then added to the reactor and the contents stirred for 10 minutes. Triethylamine (15 milliliters (ml), 0.1 moles) dissolved in 1 L dichloromethane was then added and additional caustic added as needed to raise the reactor contents to a pH of 9 to 10. The reaction was stirred at a pH of 9 for 5 minutes, at which time no chloroformates were detected. An additional 200 g phosgene (2.02 moles) was added at a rate of 60 g/min while sufficient 50 wt % caustic was added to maintain a pH of 9 to 10. The reactor was then purged with nitrogen gas for 10 minutes to remove any residual phosgene.

The reactor contents were then transferred to another tank and centrifuged to remove the brine layer. The organic layer (containing polymer) was washed with 1 N HCl and then with deionized water until residual chloride ion levels were less than 5 ppm. The polymer was isolated by methanol precipitation, followed by vacuum drying. The final dried resin powder had a Mw of 44467 and a PDI of 3.3 (by GPC using polycarbonate standards), less than 1 ppm triethylamine, less than 0.1 ppm chloride ion, and 0.17 ppm iron.

EXAMPLE 2

To a 75-L reactor equipped with mechanical agitation, condenser, and caustic scrubber vent system was charged 2395 g BHPD (6.1 moles), 104 g BPA (0.45 moles), 10 L deionized water, and 29 L dichloromethane. The reactor was flushed with nitrogen at a rate of 10 g/min for 5 minutes. Phosgene (1000 g, 10.1 moles) was then added at a rate of 60 g/min to the reactor while 50 wt % caustic was added at a rate to maintain a pH of 7.0. A solution of 21 g p-cumylphenol in 1 L dichloromethane was then added to the reactor and the contents stirred for 10 minutes. Triethylamine (15 ml, 0.1 moles) dissolved in 1 L dichloromethane was then added and additional caustic added as needed to raise the reactor contents to a pH of 9 to 10. The reaction was stirred at a pH of 9 for 5 minutes, at which time no chloroformates were detected. An additional 200 g phosgene (2.02 moles) was added at a rate of 60 g/minute while sufficient 50 wt % caustic was added to maintain a pH of 9 to 10. The reactor was then purged with nitrogen gas for 10 minutes to remove any residual phosgene.

The reactor contents were then transferred to another tank and centrifuged to remove the brine layer. The organic layer (containing polymer) was washed with 1 N HCl and then with deionized water until residual chloride ion levels were less than 5 ppm. The polymer was isolated by methanol precipitation followed by vacuum drying to yield a resin powder. The dried resin powder had a Mw of 57297 and a PDI of 3.4 (by GPC, using polycarbonate standards), less than 1 ppm triethylamine, 0.14 ppm chloride ion, and 0.23 ppm iron.

EXAMPLE 3

To a 75-L reactor equipped with mechanical agitation, condenser, and caustic scrubber vent system was charged 2395 g BHPD (6.1 moles), 104 g BPA (0.45 moles), 10 L deionized water, and 29 L dichloromethane. The reactor was flushed with nitrogen at a rate of 10 g/min for 5 minutes. Phosgene (1000 g, or 10.1 moles) was then added at a rate of 60 g/min to the reactor while 50 wt % caustic was added at a rate sufficient to maintain a pH of 7.0. A solution of 14 g p-cumylphenol in 1 L dichloromethane was then added to the reactor and the contents stirred for 10 minutes. Triethylamine (15 ml, 0.1 moles) dissolved in 1 L dichloromethane was then added and additional caustic added as needed to raise the reactor contents to a pH of 9 to 10. The reaction was stirred at a pH of 9 for 5 minutes, at which time no chloroformates were detected. An additional 200 g phosgene (2.02 moles) was added at a rate of 60 g/minute while sufficient 50 wt % caustic was added to maintain a pH of 9 to 10. The reactor was then purged with nitrogen gas for 10 minutes to remove any residual phosgene.

The reactor contents were then transferred to another tank and centrifuged to remove the brine layer. The organic layer (containing polymer) was washed with 1 N HCl and then with deionized water until residual chloride ion levels were less than 5 ppm. The polymer was isolated by methanol precipitation followed by vacuum drying. The final dried resin powder had a Mw of 83086 and a PDI of 2.20 (by GPC, using polycarbonate standards), less than 1 ppm triethylamine, 0.14 ppm chloride ion, and 0.18 ppm iron.

EXAMPLE 4

To a 75-L reactor equipped with mechanical agitation, condenser, and caustic scrubber vent system was charged 2500 g of BHPD (6.4 moles), 10 L of deionized water, and 29 L of dichloromethane. The reactor was flushed with nitrogen at a rate of 10 g nitrogen/min for 5 minutes. Phosgene (1000 g, 10.1 moles) was then added at a rate of 60 g/min to the reactor while 50 wt % caustic was added at a rate to maintain the pH at 7.0. A solution of 10 g of p-cumylphenol in 1 L of dichloromethane was then added to the reactor and the contents stirred for 10 minutes. Triethylamine (15 ml, 0.1 moles) dissolved in 1 L of dichloromethane was then added and additional caustic added as needed to raise the reactor contents to a pH of 9 to 10. The reaction stirred at a pH of 9 for 5 minutes, at which time no chloroformates were detected. An additional 200 g of phosgene (2.02 moles) was added at a rate of 60 g/min while sufficient 50 wt % caustic was added to maintain the pH at 9 to 10. The reactor was then purged with nitrogen gas for 10 minutes to remove any residual phosgene. A sample of polymer solution was analyzed by GPC using polycarbonate standards, and showed a Mw of 110905 at this point in the process.

The reactor contents were then transferred to another tank and centrifuged to remove the brine layer. The organic layer containing the polymer was washed with 1 N HCl and then with deionized water until residual chloride ion levels were less than 5 ppm. The polymer was isolated by steam precipitation followed by drying under nitrogen to yield a resin powder. The dried resin powder had a Mw of 32249 and a PDI of 2.8 (by GPC, using polycarbonate standards), less than 1 ppm triethylamine, 0.81 ppm chloride ion, and 0.04 ppm iron.

This example illustrates that using steam precipitation to isolate homopolymers derived from BHPD results in polymers of lower molecular weight.

EXAMPLE 5

To a 75-L reactor equipped with mechanical agitation, condenser, and caustic scrubber vent system was charged 2395 g BHPD (6.1 moles), 104 g BPA (0.45 moles), 10 L deionized water, and 29 L of dichloromethane. The reactor was flushed with nitrogen at a rate of 10 g/min for 5 minutes. Phosgene (1000 g, 10.1 moles) was then added at a rate of 60 g/min to the reactor while 50 wt % caustic was added at a rate to maintain a pH of 7.0. A solution of 10 g p-cumylphenol in 1 L dichloromethane was then added to the reactor and the contents stirred for 10 minutes. Triethylamine (15 ml, 0.1 moles) dissolved in 1 L dichloromethane was then added and additional caustic added as needed to raise the pH of the reactor contents to 9 to 10. The reaction was stirred at a pH of 9 for 5 minutes, at which time no chloroformates were detected. An additional 200 g phosgene (2.02 moles) was added at a rate of 60 g/min while sufficient 50 wt % caustic was added to maintain a pH of 9 to 10. The reactor was then purged with nitrogen for 10 minutes to remove any residual phosgene. A sample of the polymer solution was analyzed by GPC using polycarbonate standards, and showed a Mw of 100280 at this point in the process.

The reactor contents were then transferred to another tank and centrifuged to remove the brine layer. The organic layer containing polymer was washed with 1 N HCl and then with deionized water until residual chloride ion levels were less than 5 ppm. A sample of polymer solution was analyzed by GPC versus polycarbonate standards, and showed a Mw of 98319 at this point in the process. The polymer was isolated by steam precipitation, followed by drying under nitrogen, to yield a resin powder. The dried resin powder had a Mw of 70928 and a PDI of 4.32, (by GPC using polycarbonate standards), less than 1 ppm triethylamine, 0.8 ppm chloride ion, and less than 0.03 ppm iron.

This example illustrates that using steam precipitation for the isolation of a copolycarbonate derived from BHPD and another aromatic dihydroxy compound results in a polymer of lower molecular weight. However, it also illustrates that the copolymers, when prepared in accordance with the methods described herein, are of such high molecular weight that the copolymers obtained after steam precipitation have an Mw of greater than 70,000.

EXAMPLE 6 AND COMPARATIVE EXAMPLE A

Samples of the above polymers (the steam-precipitated homopolymer of Example 4 (Mw=32,000) and the steam-precipitated copolymer of Example 5 (Mw=70,098)) were formed into films using the following procedure.

The films were prepared by dissolving resin powder in sufficient methylene chloride to provide a 15 to 20 wt. % solution, depending on the molecular weight of copolycarbonate. The solutions was cast using a solution caster (Erichsen Coatmaster 509 MC-1, microprocessor controlled film applicator) with the blade height adjusted based on percent solids in solution to achieve a thickness of 10 micrometers to 150 micrometers. The films were cast onto smooth glass substrates and the methylene chloride removed by slow evaporation at room temperature overnight. Slow evaporation enhances film quality. If solvent removal is too fast, haze and bubbles may form on the film surface, which are not desirable for many applications. Therefore, the substrate is covered by an aluminum foil and put into the oven at 80° C. the next day for 1 to 3 hours for further drying of the films before use.

Transmission of a 70 micrometer thick film consisting of the copolycarbonate (Example 6) was found to be about 89%, measured in accordance with ASTM D1003-00 using an ultraviolet-visible (UV-VIS) spectrophotometer.

Steady state shrinkage values were 10 ppm/hour. CTE of the film in the X-Y direction was found to be 54 to 55 ppm/° C. over a temperature range of 50 to 150° C., determined according to ASTM E831-93 using a thermal mechanical analyzer (TMA). Samples were heated to 200° C. and maintained at this temperature isothermally for 8 hours, and then cooled to room temperature. CTE was measured during the heating and cooling ramp and steady state shrinkage rate (ppm/hour) was measured during the isotherm.

A 70 micrometer thick film consisting of the homopolycarbonate (comparative Example A) was slightly hazy, with a transmission 83.5%. The film was also brittle. These results show that incorporation of low levels of BPA resulted in more transparent solvent cast films while maintaining high Tg for high temperature applications.

The singular forms "a," "an," and "the" include plural referents unless the context clearly dictates otherwise. "Optional" or "optionally" means that the subsequently described event or circumstance may or may not occur, and that the description includes instances where the event occurs and instances where it does not. Compounds are described using standard nomenclature. For example, any position not substituted by any indicated group is understood to have its valency filled by a bond as indicated, or a hydrogen atom. The endpoints of all ranges reciting the same property or quantity are independently combinable and inclusive of the recited endpoint. All references are incorporated herein by reference.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A copolycarbonate, comprising units of the formula (1)

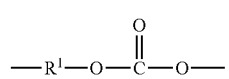

(1)

wherein 70 to 99.5 mole percent of the total number of $R^1$ groups are derived from a dihydroxy compound of formula (2)

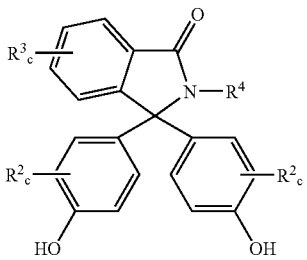 (2)

wherein $R^2$ and $R^3$ are each independently a halogen or a $C_{1-6}$ alkyl group, $R^4$ is a phenyl group, and each c is independently 0 to 4; and 0.5 to 30 mole percent of the total number of $R^1$ groups are derived from a dihydroxy compound of formula (3)

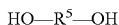 (3)

wherein at least 60% of the $R^5$ groups are aromatic, and the dihydroxy compound of formula (3) is not the same as the dihydroxy compound of formula (2), and wherein the copolycarbonate has a glass transition temperature of 250° C. to 285° C., and a molecular weight of 40,000 to 150,000, measured by gel permeation chromatography using polycarbonate standards.

2. The copolycarbonate of claim 1, wherein each c is 0.

3. The copolycarbonate of claim 1, wherein the dihydroxy compound of formula (3) has the formula

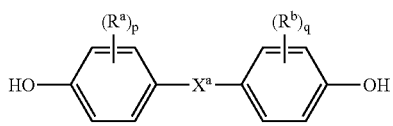

wherein $R^a$ and $R^b$ are each independently a halogen atom or a monovalent $C_{1-6}$ alkyl group; p and q are each independently integers of 0 to 4; and $X^a$ is one of the following groups:

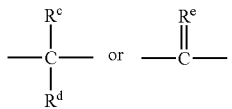

wherein $R^c$ and $R^d$ are each independently a hydrogen atom or a $C_{1-29}$ alkyl group, or $R^c$, C, and $R_d$ taken together are a divalent $C_{3-10}$ cycloalkyl group that is optionally substituted with one or more $C_{1-10}$ alkyl groups, and $R^e$ is a divalent hydrocarbon group.

4. The copolycarbonate of claim 1, wherein each p and q is 0 and $X^a$ is 2,2-propylene.

5. The copolycarbonate of claim 1, wherein 80 to 99 mole % of the $R^1$ groups in the copolycarbonate are derived from a compound of formula (2), and 1 to 20 mole % of the $R^1$ groups are derived from the different dihydroxy compound.

6. The copolycarbonate of claim 1, wherein 90 to 96 mole % of the $R^1$ groups in the copolycarbonate are derived from a compound of formula (2), and 4 to 10 mole % of the $R^1$ groups are derived from the different dihydroxy compound.

7. The copolycarbonate of claim 1 having a Tg of 255° C. to 285° C.

8. The copolycarbonate of claim 1, having a molecular weight of 60,000 to 150,000, measured by gel permeation chromatography using polycarbonate standards.

9. The copolycarbonate of claim 1, having a transmissivity of greater than 50% measured over wavelengths of 400 to 800 nanometers.

10. The copolycarbonate of claim 1, having a shrinkage less than 40 ppm after heating at 200° C. for 8 hours.

11. The copolycarbonate of claim 1, having a CTE of less than 80 ppm/° C. measured over 50-150° C.

12. An article comprising the copolycarbonate of claim 1.

13. A method of preparing a copolycarbonate, comprising reacting a dihydroxy compound of formula (2)

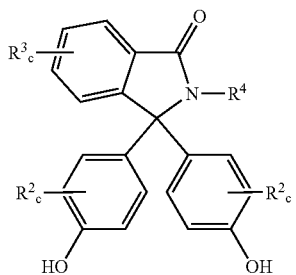 (2)

wherein $R^2$ and $R^3$ are each independently a halogen or a $C_{1-6}$ alkyl group, $R^4$ is a phenyl group, and each c is independently 0 to 4, and a dihydroxy compound of formula (3)

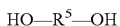 (3)

wherein at least 60% of the $R^5$ groups are aromatic, and the dihydroxy compound of formula (3) is not the same as the dihydroxy compound of formula (2), and wherein 70 to 99.5 mole percent of the total number of $R^1$ groups are derived from the dihydroxy compound of formula (2), in a reaction system comprising water, a substantially inert, substantially water-insoluble organic liquid, and an alkali or alkaline earth metal base, to produce a bischloroformate;

reacting the bischloroformate with a capping agent in a reaction system comprising water, a substantially inert, substantially water-insoluble organic liquid, and an alkali or alkaline earth metal base, to produce a partially capped bischloroformate composition; and contacting the partially capped bischloroformate composition with an interfacial polycarbonate formation catalyst and an aqueous alkali metal or alkaline earth metal base to form a copolycarbonate having a glass transition temperature of 250° C. to 285° C. and a weight average molecular weight of 40,000 to 150,000.

14. The method of claim 13, wherein each c is 0.

15. The method of claim 13, wherein the capping agent is a phenol compound.

16. The method of claim 13, wherein the interfacial copolycarbonate formation catalyst is an amine.

17. A copolycarbonate formed by the method of claim 13, having a weight average molecular weight of 60,000 to 150,000.

18. An film comprising a copolycarbonate manufactured by the method of claim 13.

19. A method of forming a film comprising a copolycarbonate, comprising
reacting
a dihydroxy compound of formula (2)

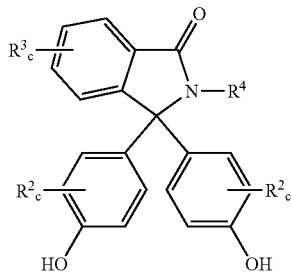

(2)

wherein $R^2$ and $R^3$ are each independently a halogen or a $C_{1-6}$ alkyl group, $R^4$ is a phenyl group, and each c is independently 0 to 4, and
a dihydroxy compound of formula (3)

HO—$R^5$—OH (3)

wherein at least 60% of the $R^5$ groups are aromatic, and the dihydroxy compound of formula (3) is not the same as the dihydroxy compound of formula (2), and
wherein 70 to 99.5 mole percent of the total number of $R^1$ groups are derived from the dihydroxy compound of formula (2), in a reaction system comprising water, a substantially inert, substantially water-insoluble organic liquid, and an alkali or alkaline earth metal base, to produce a bischloroformate;
reacting the bischloroformate with a capping agent in a reaction system comprising water, a substantially inert, substantially water-insoluble organic liquid, and an alkali or alkaline earth metal base, to produce a partially capped bischloroformate composition;
contacting the partially capped bischloroformate composition with an interfacial polycarbonate formation catalyst and an aqueous alkali metal or alkaline earth metal base to form a copolycarbonate having a glass transition temperature of 250° C. to 285° C. and a weight average molecular weight of 40,000 to 150,000;
separating the water phase and the substantially inert, substantially water-insoluble organic liquid phase; and
casting the organic phase to form a film.

20. The article of claim 12, wherein the article is a film.

21. A copolycarbonate, comprising
units of the formula (1)

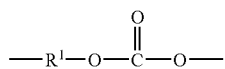

(1)

wherein
70 to 99.5 mole percent of the total number of $R^1$ groups are derived from a dihydroxy compound of formula (2)

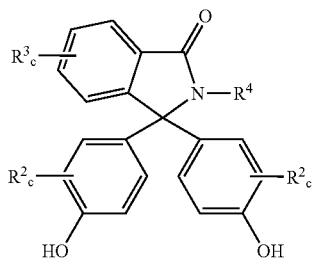

(2)

wherein $R^2$ and $R^3$ are each independently a halogen or a $C_{1-6}$ alkyl group, $R^4$ is a phenyl group, and each c is independently 0 to 4; and p1 0.5 to 30 mole percent of the total number of $R^1$ groups are derived from bisphenol A, and
wherein the copolycarbonate has a glass transition temperature of 250° C. to 285° C., and a molecular weight of 40,000 to 150,000, measured by gel permeation chromatography using polycarbonate standards.

* * * * *